Nov. 25, 1969   H. B. RATH   3,480,116
YOKE MOUNTING AND GUIDE MEANS FOR SPOT-TYPE DISC BRAKE
Original Filed May 4, 1966   3 Sheets-Sheet 3

3,480,116
YOKE MOUNTING AND GUIDE MEANS FOR SPOT-TYPE DISC BRAKE

Heinrich Bernhard Rath, Koblenz-Luetzel, Germany, assignor to Girling Limited, Tyseley, Birmingham, England, a company of Great Britain
Continuation of application Ser. No. 547,597, May 4, 1966. This application Aug. 8, 1968, Ser. No. 753,841
Claims priority, application Great Britain, May 6, 1965, 19,082/65
Int. Cl. F16d 55/36, 65/12
U.S. Cl. 188—73       12 Claims

ABSTRACT OF THE DISCLOSURE

In a disc brake of the sliding yoke reaction type the yoke formed as a casting is slidably guided on spaced parallel surfaces of substantial radial depth on a stationary member and is urged against shoulders on the stationary member adjacent to the inner ends of the parallel guiding surfaces.

---

This application is a continuation of application Ser. No. 547,597 filed May 4, 1966, and now abandoned.

This invention relates to improvements in disc brakes of the kind in which an hydraulic actuator located in a stationary member adjacent to one side of a rotatable disc applies a friction pad directly to the adjacent face of the disc and applies a second friction pad to the opposite face of the disc through a yoke which is mounted on or in the stationary member for movement in a direction parallel to the axis of the disc.

According to one feature of my invention, in a disc brake of that kind the yoke, which is conveniently formed as a casting, is slidably guided on spaced parallel surfaces of substantial radial depth on the stationary member and is urged by resilient means against shoulders on the stationary member adjacent to the inner ends of said surfaces.

The guiding surfaces are preferably continued in an axial direction by spaced parallel arms extending forwardly from the stationary member, these arms being located outside the peripheral edge of the disc and extending over the periphery to or adjacent to the face of the disc remote from the stationary member.

The inner sides of these arms provide guiding surfaces for the directly actuated friction pad.

The indirectly actuated friction pad is carried by the yoke and when the brake is applied the drag on this pad is taken through the yoke on the outer surface of one or other of the arms according to the direction of rotation of the disc. Owing to the extension of the arms over the periphery of the disc the drag force is taken on the arm close to the drag line and the couple tending to rotate the yoke is reduced.

One form of brake in accordance with our invention and a modification are illustrated by way of example in the accompanying drawings in which:

FIGURE 2 is a plan;

Figure 1:
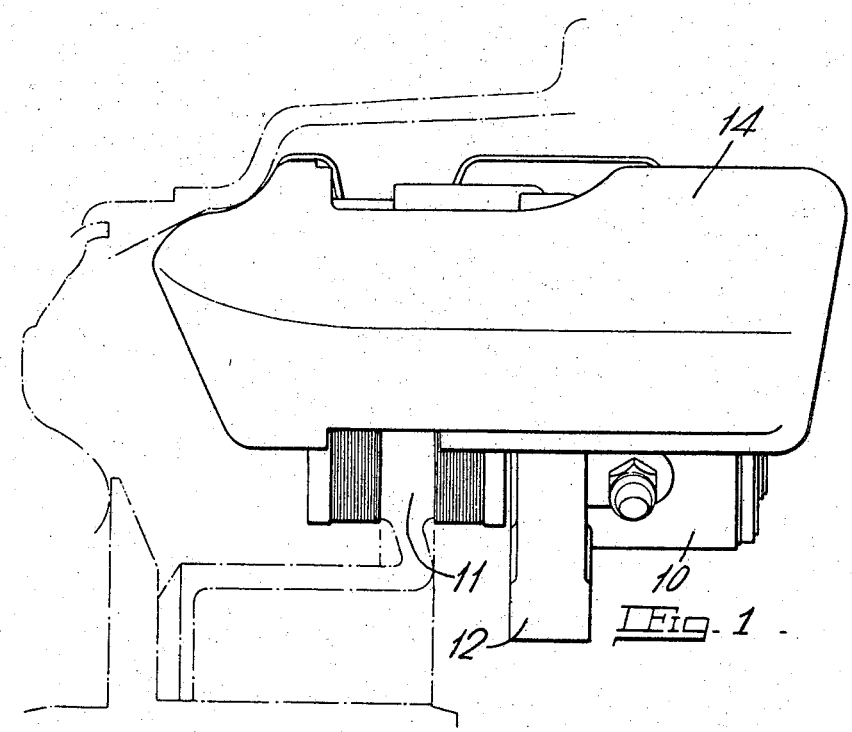
FIGURE 1 is an end elevation of the brake showing a portion of the brake disc.
Figure 3:
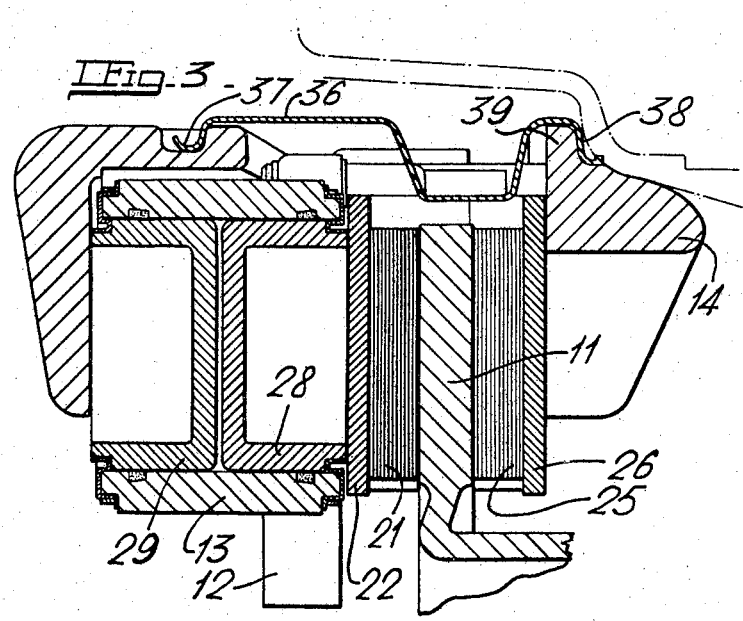
FIGURE 3 is a section in a plane at right angles to the plane of the brake disc on the line 3—3 of FIGURE 2.
Figure 4:
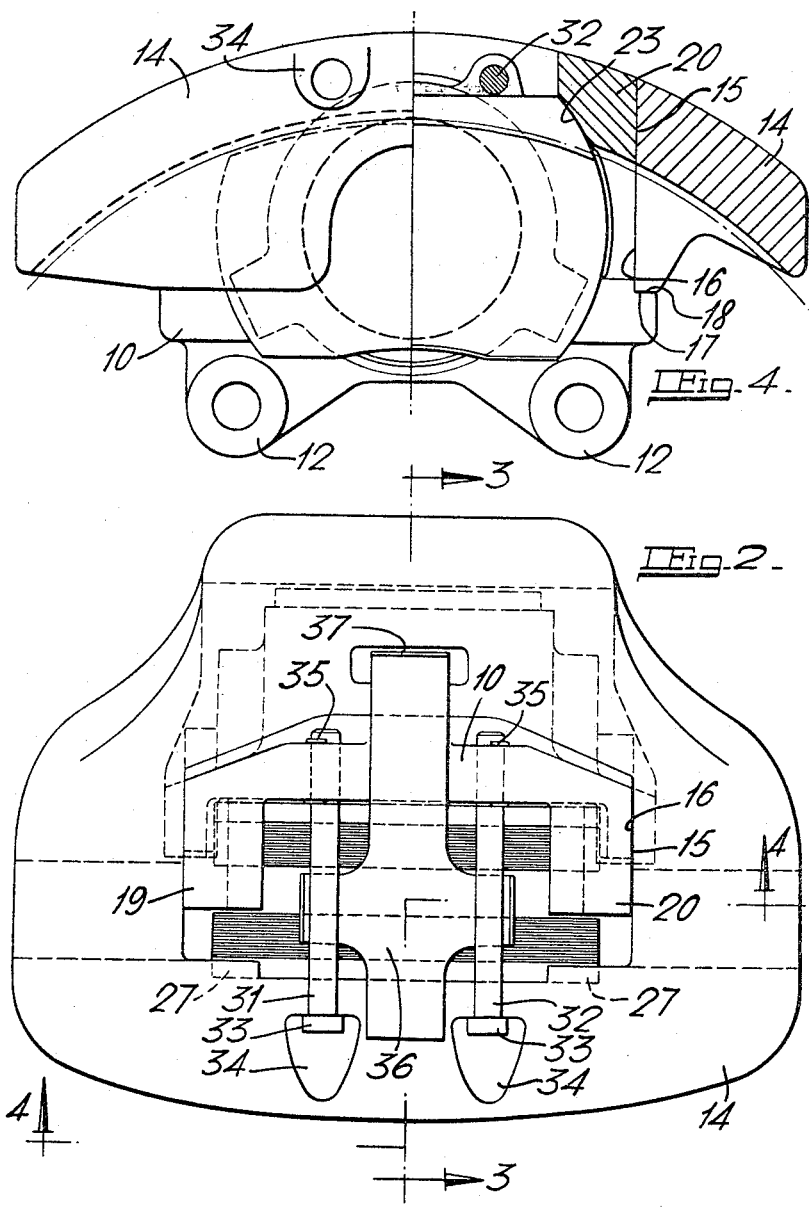
FIGURE 4 is a side view half in section on the line 4—4 of FIGURE 2.
Figure 5:
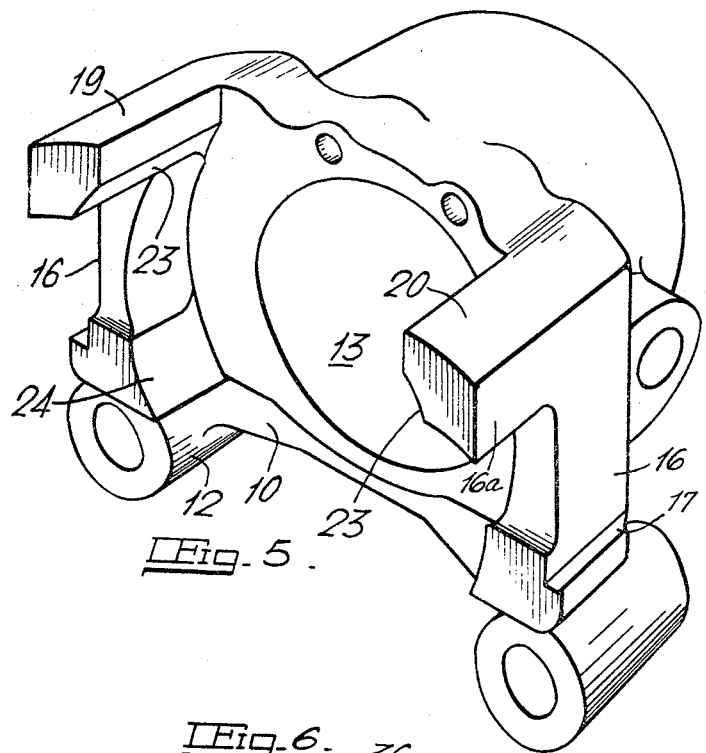
FIGURE 5 is a perspective view of the stationary member or carrier of the brake.

In the brake shown in FIGURES 1 to 5 a stationary member or carrier 10 is mounted on a stationary or non-rotating part at one side of a rotatable brake disc 11. For mounting purposes the carrier has two spaced inwardly projecting lugs 12 on its inner side drilled to receive securing bolts. The carrier which is conveniently formed as a casting incorporates an hydraulic cylinder 13 of which the axis is substantially at right angles to the plane of the disc. The cylinder may be formed by a bore in the carrier or it may be a separate member rigidly fixed in an opening in the carrier as shown more particularly in FIGURE 3.

Slidably mounted on the carrier for movement in a direction parallel to the axis of the disc is a yoke 14 which is preferably formed as a casting and has a central opening fitting over the carrier and a portion of the periphery of the disc. The opening is finished, preferably by a broaching operation, to provide two spaced flat parallel surfaces 15 which engage slidably with complementary flat parallel guiding surfaces 16 on opposite sides of the carrier 10. At the inner end of each of the guiding surfaces 16 there is a step or shoulder 17 with which a complementary machined edge 18 on the yoke slidably engages. The guiding surfaces 16 are continued in an axial direction by the outer surfaces 16a of spaced parallel arms 19, 20 integral with and extending forwardly from the carrier, these arms being located outside the periphery of the brake disc and extending over the periphery to or adjacent to the face of the disc remote from the carrier as shown more particularly in FIGURE 2 where it will be noted that all parts of the arm guiding surfaces extending over the disc are wholly radially outwardly of the disc periphery.

A friction pad 21 for engagement with the face of the disc next to the carrier is bonded or otherwise secured to a rigid backing plate 22 having substantially straight and parallel inner and outer edges and part-circular ends centered on the axis of the cylinder 13. The pad assembly is guided for movement towards and away from the disc by the sliding engagement of the part-circular ends of the backing plate with complementary part-cylindrical guiding surfaces 23 on the inner sides of the arms 19, 20 and similar surfaces 24 on the carrier spaced radially inwards from the arms.

A friction pad 25 for engagement with the opposite face of the brake disc is bonded to a backing plate 26 which is housed in a recess 27 in the yoke.

The friction pad 21 is directly applied to the brake disc by a piston 28 working in the cylinder 13, and an opposed piston 29 acts on the yoke to bring the friction pad 25 into engagement with the opposite face of the disc when the pistons are separated by pressure fluid forced between them from a master cylinder or other source of fluid under pressure.

The drag on the directly actuated friction pad 21 when the brake is applied is taken by one or other of the arms 19, 20 according to the direction of rotation of the brake disc and the drag on the friction pad 25 is taken through the yoke on the outer surface of the other arm. Owing to the extension of the arms over the periphery of the disc the drag force on the friction pad 25 is taken on the arm close to the drag line and the couple tending to rotate the yoke is reduced.

Radial movement of the friction pad 21 in an outward direction is prevented by removable pins 31, 32 located on the outer side of the friction pads and parallel to the axis of the disc. The pins are mounted in holes in the yoke, heads 33 on one end of the pins being received in recesses 34 in the yoke, and the other ends of the pins are slidably engaged in holes in the carrier 10, the pins being retained against removal by split pins 35.

The yoke is resiliently urged radially inwards into engagement with the shoulders on the carrier by a plate spring 36 of cruciform outline in plan located over the opening in the yoke. The free end of one limb of the spring is formed with a depressed rib 37 to engage in a recess in the yoke on the carrier side of the disc and the free end of the opposed limb is cranked at 38 to engage over a raised step 39 on the yoke on the other side of the disc. The ends of the other limbs are engaged under the pins 21, 22 as shown more particularly in FIGURES 2 and 3.

When the friction pads are worn and have to be replaced the pins 21 and 22 can be withdrawn after removal of the split pins 35 and then the plate spring can be lifted off. The radial dimension of the backing plate 22 of the friction pad 21 is less than the minimum spacing between the arms 19, 20 so that by rotating the friction pad assembly through 90° it can be drawn out in a radial direction between the arms.

Figure 6:
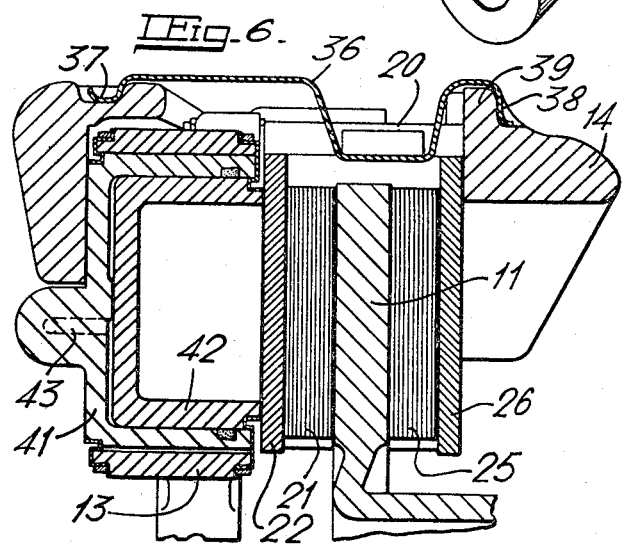
FIGURE 6 is a section similar to FIGURE 3 but showing a modified arrangement of the hydraulic piston.

In the modification shown in FIGURE 6 the general arrangement is the same and the same reference numerals have been applied to corresponding parts.

However the opposed pistons 28 and 29 have been replaced by a hollow outer piston or cylinder 41 working in the cylinder 13 and acting on the yoke 14 and an inner piston 42 working in the piston 41 and acting on the directly actuated friction pad 21. Pressure fluid is fed to the space between the closed ends of the pistons through a passage 43 in the end of the outer piston adapted to be connected through a flexible pipe to a master cylinder or other source of fluid under pressure.

In the claims for purposes of clarity, the guiding surfaces 23, 24 for the directly actuated pads are referred to as the first guiding surfaces, the guiding surfaces 16a extending over the periphery of the disc on the arms 19, 20 are referred to as the second guiding surfaces, and the guiding surfaces 16 on the stationary member above the shoulders 17 are referred to as the third guiding surfaces.

I claim:

1. A disc brake for vehicles comprising a rotatable brake disc, a stationary carrier located on one side of the disc, a first friction pad assembly slidably guided in the carrier for movement towards and away from the disc, axially extending spaced parallel guiding surfaces on said carrier parallel to the axis of the disc, a single, axially extending, outwardly facing shoulder on each of said guiding surfaces, said shoulders being at the radially innermost ends of said parallel guiding surfaces, a yoke constructed from a casting having an opening adapted to receive said carrier and a portion of the periphery of the disc, spaced parallel surfaces at opposite sides of said opening for sliding engagement with said first mentioned parallel guiding surfaces, resilient means urging said yoke radially inwards into engagement with said shoulders, a second friction pad assembly carried by said yoke for application to the face of the disc remote from the carrier, and an hydraulic actuator in said carrier for directly applying the first friction pad assembly to the face of the disc adjacent to the carrier and for simultaneously moving the yoke in the opposite direction to apply the second friction pad assembly to the face of the disc remote from the carrier, said resilient means comprising a plate spring of cruciform outline in plan, two opposed arms of said spring bearing on the yoke at spaced points on opposite sides of the disc and the other two arms being engaged with removable pins extending across the plane of the disc between portions of the yoke and carrier on the outer side of the first friction pad assembly which is retained against radial movement in an outward direction by said pins.

2. A disc brake for vehicles comprising a rotatable disc, a first friction pad on one side of said disc, said friction pad having a pair of circumferentially spaced torque transmitting abutments thereon, each abutment facing oppositely from the other abutment, a stationary carrier located on said one side of said disc, a pair of circumferentially spaced guiding surfaces on said carrier on said one side of said disc, each guiding surface being opposed to and slidably receiving in co-acting relationship an abutment on said friction pad such that when the disc is rotating in either direction and torque is exerted thereby on said pad in a direction corresponding to the direction of rotation of said disc one abutment is urged toward its guiding surface while the other is urged away from its guiding surface, a clamping member fitting over a portion of the periphery of the disc, a second friction pad carried by said clamping member on the second side of said disc in substantially opposing relationship to said first pad, a pair of circumferentially spaced torque transmitting abutments on said clamping member, each abutment facing oppositely from the other abutment, a pair of circumferentially spaced arms rigid with said carrier and extending over the peripheral edge of said disc, each of said arms having a guiding surface thereon which is wholly radially outwardly of the periphery of the disc and being opposed to and slidably receiving in co-acting relationship an abutment on said clamping member such that when the disc is rotating in either direction and torque is exerted thereby through said second pad to said clamping member in a direction corresponding to the direction of rotation of said disc, one clamping member abutment is urged towards its guiding surface on said arms while the other is urged away from its guiding surface, and means for moving said first pad toward said disc while simultaneously moving said clamping member in the opposite direction.

3. A disc brake for vehicles comprising a rotatable disc, first and second friction pads for engagement with opposite faces of said disc, said first friction pad being located on one side of said disc and having opposed end edges, a stationary member located on said one side of said disc, a first pair of spaced parallel guiding surfaces on said stationary member located on said one side of said disc and extending towards said disc, said end edges of said first friction pad co-operating slidably with said guiding surfaces, a clamping member fitting over a portion of the periphery of said disc and carrying said second friction pad on a second side of said disc opposite to said first side, spaced parallel arms on said stationary member extending over the peripheral edge of the disc, a second pair of parallel guiding surfaces on said arms, all parts of said arm guiding surfaces extending over the periphery of the disc being wholly radially outwardly of the periphery of said disc, complementary parallel guiding surfaces on said clamping member slidably co-operating with said parallel guiding surfaces on said arms to guide said clamping member relative to said stationary member in a direction parallel to the axis of the disc, the guiding surfaces on the arms and clamping member being constructed and arranged that when the disc is rotating in either direction the drag exerted thereby on said second friction pad in a direction corresponding to the direction of rotation of the disc is taken by one of said arms with which the clamping member is in abutting engagement, the clamping member tending to move out of engagement with the other arm, and means for moving said first friction pad towards said disc while simultaneously moving said clamping member in the opposite direction.

4. The disc brake of claim 3 wherein said first and second pairs of guiding surfaces are circumferentially spaced from each other.

5. A disc brake as claimed in claim 3 wherein said first pair of guiding surfaces are of part-cylindrical form, and said first friction pad assembly comprises a friction pad secured to a rigid backing plate having part circular ends for co-operating with said part-cylindrical guiding surfaces, and similar part-cylindrical surfaces on the stationary member spaced radially inwards from said first pair of guiding surfaces and also co-operating with the part circular ends of said backing plate.

6. A disc brake as claimed in claim 3 wherein said clamping member has an opening adapted to receive said stationary member and a portion of the periphery of the disc, axially extending third spaced parallel guiding surfaces on said stationary member, the second guiding surfaces on said arms being extensions of said third guiding surfaces on said stationary member, and spaced parallel surfaces at opposite sides of the opening in said clamping member for sliding engagement with the second and third surfaces on said stationary member.

7. A disc brake as claimed in claim 6 wherein the second guiding surfaces of said arms are continuous and coplanar with the third guiding surfaces on the stationary member.

8. A disc brake as claimed in claim 6 including a single axially extending outwardly facing shoulder on the radially innermost end of each of the third guiding surfaces on said stationary member, and resilient means cooperating with said stationary member and said clamping member to urge the latter into engagement with said shoulders.

9. A disc brake as claimed in claim 8 wherein said clamping member is a yoke, and the resilient means urging the yoke into engagement with the shoulders on the carrier stationary member comprises a plate spring of cruciform outline in plan, two opposed arms of said spring bearing on the yoke at spaced points on opposite sides of the disc and the other two arms being engaged with removable pins extending across the plane of the disc between portions of the yoke and the stationary member and on the outer side of the first friction pad assembly which is retained against radial movement in an outward direction by said pins.

10. A disc brake for vehicles comprising a rotatable disc, a stationary member adjacent one side of the disc, guide surfaces of substantial radial depth on said stationary member on said one side of said disc, a directly actuated pad adjacent said disc on said one side thereof, an indirectly actuated pad adjacent said disc on the opposite side thereof, spaced parallel arms extending from said stationary member and having axially extending guiding surfaces thereon outside the peripheral edge of the disc and extending over the periphery of the disc, a yoke operatively engaging said indirectly actuated pad for moving it into engagement with its adjacent face of said disc and for sustaining drag exerted by said disc on said pad, said yoke being slidably guided on the guide surfaces of substantial radial depth and on the guiding surfaces of said arms and transmitting the drag force of said indirectly actuated pad to one or the other of said arms according to the direction of rotation of the disc, an actuator operatively engaging said directly actuated pad and said yoke on the side of said disc adjacent said directly actuated pad to move it and said yoke in opposite directions to apply the brakes, spaced guiding parts on said directly actuated pad, and complementary guiding surfaces between said actuator and said disc slidably cooperating with the guiding parts on said directly actuated pad.

11. A disc brake in accordance with claim 10 wherein said actuator includes parts which act in opposite directions, one of said parts acting on the directly actuated friction pad and the other on the yoke.

12. A disc brake for vehicles comprising a rotatable disc, first and second friction pads for engagement with opposite faces of the disc, said first friction pad being located on one side of said disc and having circumferentially spaced guide edges, a stationary member located on said one side of said disc, a first pair of spaced parallel guiding surfaces located on said one side of said disc and extending axially towards said disc, said guide edges of said first friction pad co-operating slidably with said guiding surfaces for axial movement towards and away from said disc and for receiving drag exerted on said pad by said disc, a clamping member fitting over a portion of the periphery of said disc and operatively engaging said second friction pad for moving said pad into engagement with the opposite side of said disc and for sustaining the drag exerted on said second pad by said disc, spaced parallel arms on said stationary member extending over the peripheral edge of said disc, a second pair of spaced parallel guiding surfaces on said arms located outside the peripheral edge of the disc and extending thereover, a third pair of spaced parallel guiding surfaces on said stationary member on said one side of said disc, complementary first and second parallel guiding surfaces on said clamping member slidably co-operating with said second and third parallel guiding surfaces on said arms and on said stationary member, respectively, to guide said clamping member relative to said stationary member in a direction parallel to the axis of the disc and to sustain the braking torque exerted on said clamping member, and actuator means on said one side of said disc operatively engaging said directly actuated pad and said clamping member to move said pad and said clamping member in opposite directions to apply the brakes.

References Cited

UNITED STATES PATENTS

| 3,243,017 | 3/1966 | Kleinstuck. |
| 3,245,500 | 4/1966 | Hambling et al. |
| 3,310,135 | 3/1967 | Wells _____ 188—73 |

FOREIGN PATENTS 905,797   9/1962   Great Britain.

GEORGE E. A. HALVOSA, Primary Examiner

U.S. Cl. X.R.

188—205